(12) United States Patent
Almog et al.

(10) Patent No.: US 11,417,024 B2
(45) Date of Patent: Aug. 16, 2022

(54) SYSTEMS AND METHODS FOR HUE BASED ENCODING OF A DIGITAL IMAGE

(71) Applicant: MOMENTICK LTD, Ramat Hasharon (IL)

(72) Inventors: Ophir Almog, Ramat Gan (IL); Lev Oren, Ramat Hasharon (IL); Daniel Kashmir, Tel Aviv (IL)

(73) Assignee: MOMENTICK LTD., Ramat Hasharon (IL)

( * ) Notice: Subject to any disclaimer, the term of this patent is extended or adjusted under 35 U.S.C. 154(b) by 0 days.

(21) Appl. No.: 17/574,545

(22) Filed: Jan. 12, 2022

(65) Prior Publication Data

US 2022/0222858 A1 Jul. 14, 2022

Related U.S. Application Data

(60) Provisional application No. 63/137,190, filed on Jan. 14, 2021.

(51) Int. Cl.
*G06K 9/00* (2022.01)
*G06T 7/90* (2017.01)
*H04N 9/67* (2006.01)

(52) U.S. Cl.
CPC .............. *G06T 7/90* (2017.01); *H04N 9/67* (2013.01); *G06T 2207/10024* (2013.01)

(58) Field of Classification Search
CPC .......... G06T 5/001; G06T 5/40; G06T 5/002; G06T 7/90; G06T 3/4015; G06T 5/008; G06T 5/20; G06T 2207/00; G06T 2207/10008; G06T 2207/10024; G06T 2207/20172; G06T 2207/20182; G06T 2207/20192; H04N 9/045; H04N 1/6027; H04N 1/60; H04N 1/40012; H04N 1/40018; H04N 1/40025; H04N 1/40031; H04N 1/40037; H04N 1/40043; H04N 1/4005; H04N 1/40056; H04N 1/40062; H04N 1/40068; H04N 1/40075; H04N 9/67; G06K 9/00771; G06K 9/4642; G06K 9/4652

See application file for complete search history.

(56) References Cited

U.S. PATENT DOCUMENTS

| | | |
|---|---|---|
| 6,674,907 B1 | 1/2004 | Shum et al. |
| 7,978,911 B2 | 7/2011 | Cheong et al. |
| 9,934,450 B2 | 4/2018 | Bercovich et al. |

(Continued)

OTHER PUBLICATIONS

P. Anandajayam et al; Preferences Extraction and Ranking Functions in Mobile Search; ICICES2014—S.A. Engineering College, Chennai, Tamil Nadu, India, Apr. 3, 2019.

(Continued)

*Primary Examiner* — Duy M Dang
(74) *Attorney, Agent, or Firm* — Pearl Cohen Zedek Latzer Baratz LLP

(57) ABSTRACT

A system and method for encoding a digital image may include obtaining image data of the digital image, wherein the image data comprises a plurality of image pixels, selecting a plurality of sample pixels from the plurality of image pixels, clustering the plurality of sample pixels based on an influence function to generate a plurality of hue clusters, classifying the image pixels to the plurality of the hue clusters, and assigning hue values of the hue clusters to the plurality of the image pixels.

18 Claims, 11 Drawing Sheets

(56) References Cited

U.S. PATENT DOCUMENTS

| | | |
|---|---|---|
| 10,909,167 B1 | 2/2021 | Almog et al. |
| 2010/0049770 A1 | 2/2010 | Ismalon |
| 2010/0111362 A1* | 5/2010 | Huang .................... G06T 7/90 |
| | | 382/164 |
| 2014/0188994 A1 | 7/2014 | Patterson |
| 2014/0297645 A1 | 10/2014 | Cohen et al. |
| 2016/0342856 A1 | 11/2016 | Krenzer et al. |
| 2017/0039683 A1* | 2/2017 | Yamamoto ............. G06T 7/187 |

OTHER PUBLICATIONS

Almog O., 2002. "Accuracy and Reliability of Transformation: Geometrical and Topological Aspects". Thesis Research. Technion—Israel Institute of Technology.

Search Report of International Application No. PCT/IL2022/050053 dated Apr. 6, 2022.

Marcu, Gabriel G., and Satoshi Abe. "3D histogram visualization in different color spaces with application in color clustering classification." Device-Independent Color Imaging II. vol. 2414,p. 146-157. International Society for Optics and Photonics, 1995. Dec. 31, 1995.

James, I. Samuel Peter. Face Image retrieval with HSV color space using clustering techniques. The SIJ Transactions on Computer Science Engineering & its Applications (CSEA), 2013, 1.1. Apr. 30, 2013.

* cited by examiner

| | IMAGE 1 | | | IMAGE 1 | | |
|---|---|---|---|---|---|---|
| POINT# | R1 | G1 | B1 | H1 | S1 | V1 |
| 301 | 78 | 81 | 52 | 47 | 92 | 81 |
| 302 | 138 | 180 | 230 | 151 | 102 | 230 |
| 303 | 255 | 254 | 239 | 40 | 16 | 255 |
| 304 | 195 | 172 | 138 | 25 | 75 | 195 |
| 305 | 131 | 132 | 127 | 51 | 10 | 132 |
| ↑ | ↑ | ↑ | ↑ | ↑ | ↑ | ↑ |
| 321 | 322 | 323 | 324 | 325 | 326 | 327 |

| AREA # | IMAGE 1 (910) | | | IMAGE 2 (920) | | | hue's subtraction (930) | | |
| --- | --- | --- | --- | --- | --- | --- | --- | --- | --- |
| | R1 | G1 | B1 | R2 | G2 | B2 | DR | DG | DB |
| 1 | 78 | 81 | 52 | 73 | 74 | 58 | 5 | 7 | -6 |
| 2 | 138 | 180 | 230 | 125 | 166 | 222 | 13 | 14 | 8 |
| 3 | 255 | 254 | 239 | 230 | 227 | 212 | 25 | 27 | 27 |
| 4 | 195 | 172 | 138 | 188 | 166 | 131 | 7 | 6 | 7 |
| 5 | 131 | 132 | 127 | 133 | 135 | 132 | -2 | -3 | -5 |

*FIG. 9A*

| AREA # | IMAGE 1 (915) | | | IMAGE 2 (925) | | | hue's subtraction (935) | | |
| --- | --- | --- | --- | --- | --- | --- | --- | --- | --- |
| | H1 | S1 | V1 | H2 | S2 | V2 | DH | DS | DV |
| 1 | 47 | 92 | 81 | 45 | 55 | 74 | 2 | 37 | 7 |
| 2 | 151 | 102 | 230 | 153 | 112 | 222 | -2 | -10 | 8 |
| 3 | 40 | 16 | 255 | 36 | 20 | 230 | 4 | -4 | 25 |
| 4 | 25 | 75 | 195 | 26 | 78 | 188 | -1 | -3 | 7 |
| 5 | 51 | 10 | 132 | 71 | 6 | 135 | -20 | 4 | -3 |

*FIG. 9B*

SYSTEMS AND METHODS FOR HUE BASED ENCODING OF A DIGITAL IMAGE

CROSS-REFERENCE TO RELATED APPLICATIONS

This application claims the benefit of U.S. Provisional Application Ser. No. 63/137,190, filed Jan. 14, 2021, which is hereby incorporated by reference in its entirety.

FIELD OF THE INVENTION

The present invention relates generally to encoding a digital image, and specifically to a hue-based encoding process of a digital image.

BACKGROUND

A variety of cameras are commonly used on a daily basis, e.g., cameras embedded in cellular devices, personal computers and surveillance equipment and the like. This had led to large amounts of image data and a development of image processing technologies. Handling large amounts of digital images requires techniques and methodologies for quick and efficient managing of image data. One of the challenges of image data processing is related to information retrieval within an image which may include, for example, detection of objects, features, colors or any other element within an image, within a plurality of similar images and/or within overlapping regions in two or more multiple images.

Automatically detecting objects and features within an image belongs to the computer vision (CV) discipline. Prior art techniques and methodologies of detecting objects may define an object by its color or texture and the boundaries of an object may delineated it from other objects in the image. However, detecting information within an image, e.g., objects, features, elements or any other items, may become a complex process due to the fact that there are many unknown conditions that may vary unintentionally or naturally between similar images, for example, illumination, shading, clouds, concealments and the like.

SUMMARY

According to embodiments of the invention, a computer-based system and a method for encoding a digital image may include: obtaining image data of the digital image, wherein the image data comprises a plurality of image pixels, selecting a plurality of sample pixels from the plurality of image pixels, clustering the plurality of sample pixels based on an influence function to generate a plurality of hue clusters, classifying the image pixels to the plurality of the hue clusters, and assigning hue values of the hue clusters to the plurality of the image pixels.

According to embodiments of the invention, clustering the plurality of sample pixels may include: setting a cluster radius, assigning the influence function to each pixel of the plurality of sample pixels, wherein the influence function is maximal at a position of a pixel and decays along the cluster radius around the position of the pixel. For each pixel of the plurality of sample pixels, calculating a sum of influence function values of all the plurality of sample pixels, and assigning the plurality of sample pixels to the hue clusters based on the sum of influence function values.

According to embodiments of the invention, assigning the plurality of sample pixels to the hue clusters may include repeating the following until all sample pixels are assigned to a hue cluster: selecting a leading pixel from the plurality of sample pixels with a highest sum of influence function values, that is not yet assigned to a hue cluster, to be a center of a hue cluster, and assigning sample pixels located within a sphere having a cluster radius around a position of the leading pixel to the hue cluster.

In some embodiments of the invention, a hue value of the leading pixel is set as a hue value of the hue cluster.

Embodiments of the invention may include obtaining digital data by converting the plurality of image pixels from red, green, blue (RGB) representation to hue, saturation, and Value (HSV) representation.

Embodiments of the invention may include selecting the plurality of sample pixels from the plurality of image pixels is a random selecting process.

According to embodiments of the invention, classifying the image pixels to the plurality of the hue clusters is based on statistical maximum likelihood estimation.

According to embodiments of the invention, the hue clusters represent leading hue values of the digital image.

Embodiments of the invention may include displaying an encoded digital image by displaying the hue values assigned to each pixel of the plurality of the image pixels.

According to embodiments of the invention, the influence function decays linearly.

BRIEF DESCRIPTION OF THE DRAWINGS

The subject matter regarded as the invention is particularly pointed out and distinctly claimed in the concluding portion of the specification. Embodiments of the invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

FIGS. 9A and 9B depict tables of hue values related to images in a hue-based adjustment method, according to embodiments of the invention;

Figure 1A:
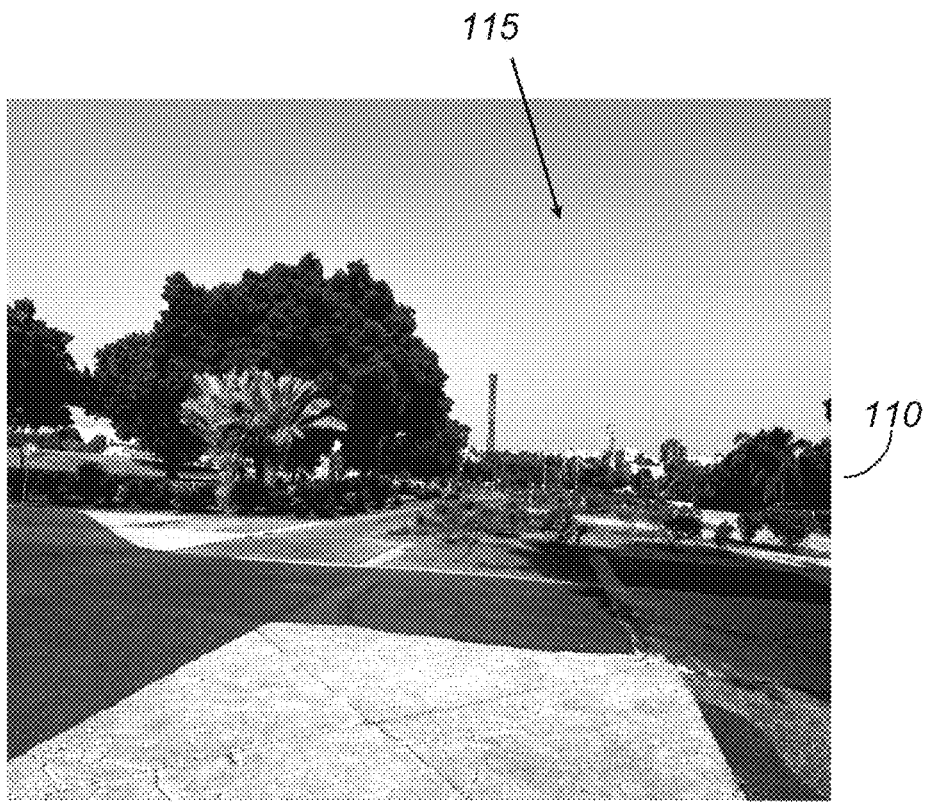
FIGS. 1A and 1B are pictorial illustrations of a hue-based encoding of a digital image, according to embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Although some embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device that manipulates and/or transforms data represented as physical (e.g., electronic) quantities within the computer's registers and/or memories into other data similarly represented as physical quantities within the computer's registers and/or memories or other information transitory or non-transitory or processor-readable storage medium that may store instructions, which when executed by the processor, cause the processor to execute operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term "set" when used herein may include one or more items unless otherwise stated. Unless explicitly stated, the method embodiments described herein are not constrained to a particular order or sequence. Additionally, some of the described method embodiments or elements thereof can occur or be performed in a different order from that described, simultaneously, at the same point in time, or concurrently.

Embodiments of the invention may provide a system and method for encoding using a computer processor a digital image using clustering methods related to a plurality of hues values in the image. According to embodiments of the invention, using the hue-based encoding method may require relatively low computational power and may be performed relatively quickly, e.g., on a mobile computing or cellular device while being used in a variety of applications, actions and processes related to encoded image data.

Embodiments of the invention may use a hue-based encoding system and method for a plurality of uses, for example, co-registering overlapping images, calibrating overlapping image's hues, matching between images based on hues, compressing unnecessary information and encoding a plurality of images into a unified image considered to be a mosaic image. The mosaic image may consist a best fusion of the plurality of image images, including a combined meta data information. The hue-based encoding system and method may be used for other utilizations, uses and deployments.

A digital image, also referred to herein simply as an image, may include a visual (e.g., optical) representation of physical objects provided in any applicable digital and computer format. Images may include simple two-dimensional (2D) array or matrix of computer pixels, e.g., values representing one or more light wavelengths or one or more ranges of light wavelength, within or beyond the visible light, in specified locations, or any other digital representation, provided in any applicable digital format such as jpg, bmp, tiff, etc. images may also include panchromatic images, multispectral images and explicit point cloud generated using laser, such as Lidar (Light detection and ranging), e.g., embedded in portable computing devices such as an IPAD pro, IPhone 12 pro, IPhone 12 pro max, or to a multi spectral cube including optical information in various wavelengths in the range of: 400-2500 nano meters. A digital image may be provided in a digital image file containing image data and metadata. The metadata may describe or include descriptors or values of a plurality of features describing characteristics, qualities or attributes of the image.

According to embodiments of the invention, an image may be encoded and compressed by a hue-based co-calibration process, which may reduce the number of hues in an image, e.g., from 16,000,000 potential hues in an image represented by an eight bit RGB (Red, Green, Blue) representation into a finite number of typical hues, e.g., 128 or 16 hues in an encoded image. Each hue in the encoded image may represent a typical, unified hue in the image which may represent, for example, a specific element, a certain material, structure and/or a designated area in the image. Each image may be reconstructed to the exact resolution of the original image accurately and efficiently based on the encoded image and parameters of the encoding process.

Embodiments of the invention may include encoding an image to a reduced number of hues which may be sufficient for a plurality of computer vision processes such as tagging, compressing, decoding and improvement of content detection. According to embodiments of the invention, the hue-based encoding process may be used in order to retrieve information from an image, e.g., to detect objects and features in an image, to find overlapping regions in two or more images in order to bring two or more images into unity of hues. Embodiments of the invention may include an unsupervised encoding process, e.g., encoding an image with no pre-existing labels or previous knowledge and/or information regarding the hues in the image.

Figure 1B:
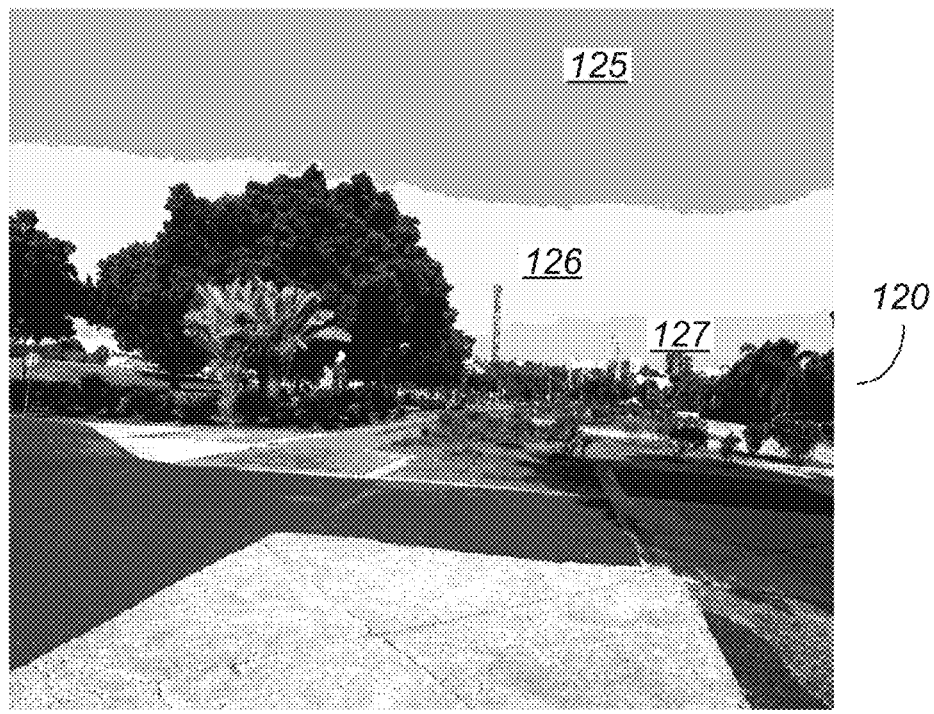

Reference is made to FIGS. 1A and 1B, which are pictorial illustrations of a hue-based encoding of a digital image, according to embodiments of the invention. According to embodiments of the invention, a hue-based encoding process may aggregate, cluster, collect or gather similar hues under one meaningful hue cluster, which may lead to a reduction in the number of hues represented in an image and may keep hues that represent regions which are significant, important, interesting or meaningful in the image. FIG. 1A shows an original image 110 having 256 gray level hues. FIG. 1B shows an encoded image 120 which is a result of a hue-based encoding process of image 110. Encoded image 120 contains only 58 gray level hues. The 58 gray level hues of image 120 may be selected according to the hue-based encoding process presented in embodiments of the invention, as the most significant hues in original image 110. For example, an area 115 in image 110 shows sky as a smooth area. The same area presenting sky in image 120, may include 3 sub-areas 125, 126 and 127 after a hue-based encoding process. Each of sub-areas 125, 126 and 127 represent a hue which is determined by the hue-based encoding algorithm as a significant or meaningful hue in image 110.

Figure 2:
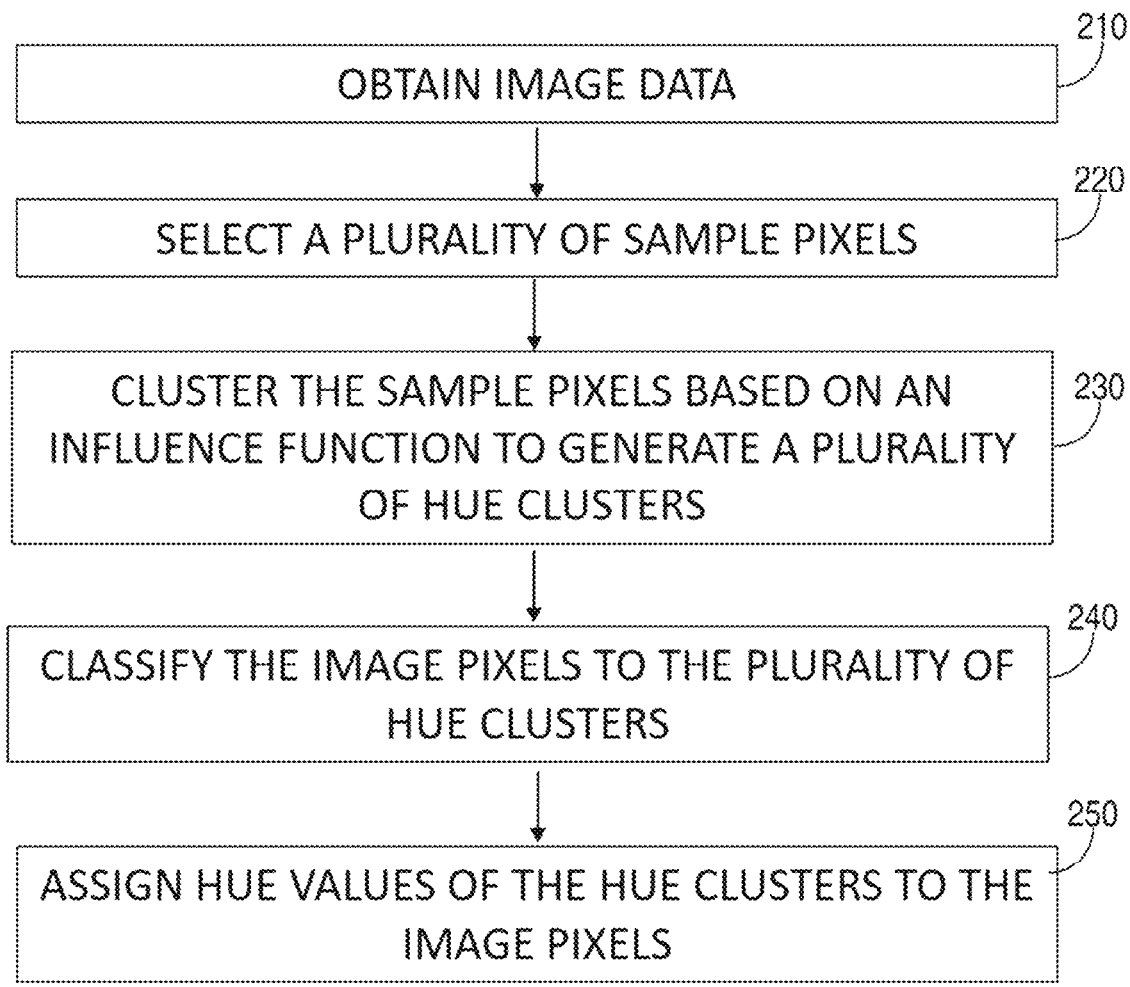
FIG. 2 is a flowchart of a method for hue-based encoding of a digital image, according to embodiments of the invention.

Reference is made to FIG. 2, which is a flowchart of a method for hue-based encoding of a digital image, according to embodiments of the invention. An embodiment of a method for hue-based encoding of a digital image may be performed, for example, by the example computer system shown in FIG. 11. As with other method flowcharts, operations of FIG. 2 may be used with operations in other flowcharts shown herein in some embodiment of the invention.

In operation 210, image data of one or more digital images may be obtained, e.g., from a sensor. Each digital image may include a plurality of image pixels and metadata related to digital image. Obtaining digital data of one or more digital images may include performing digital processing operations by one or more systems or elements of FIG. 11 and saving the image data in a memory, e.g., memory 1120 of FIG. 11, storage 1130 of FIG. 11. Image data may be saved as part of image file 1132 of FIG. 11.

In some embodiments of the invention, during an image obtaining process or during image acquisition time, one or more sensors of the acquisition device, e.g., camera, smart phone, computer and the like, may measure the amount of energy reflected for each pixel of the image in three wavelengths: red (R) which represents 650 nanometer (nm), green (G) which represents 550 nm, and blue (B) which represents 450 nm. The value of each pixel in the image may represent an arbitrary relative amount of light reflection, also referred to as Digital Number (DN). During digital image processing of an image, the physical energy reflectance information may be transformed into hue information. The transformation may be done by stretching the highest energy level in the image into maximum brightness value, e.g. in 8-bit representation, the maximum brightness value is set to 255. The minimum energy level in the image is set to zero. In some embodiments, the highest DN value may be set to the number of hues in the image, e.g., 255 in 8-bit representation, and the lowest DN value may be set to zero. All other hues are interpolated, e.g., linearly stretched accordingly to calibrate all pixel values into hues representation. Transforming the DN value into a hue value may be performed for each wavelength according to example equation [1]:

$$ImageHueValue = \frac{DN - DN_{min}}{DN_{max} - DN_{min}} * (\text{Number of hues in the image}) \quad [1]$$

Figures 3A, 3B:
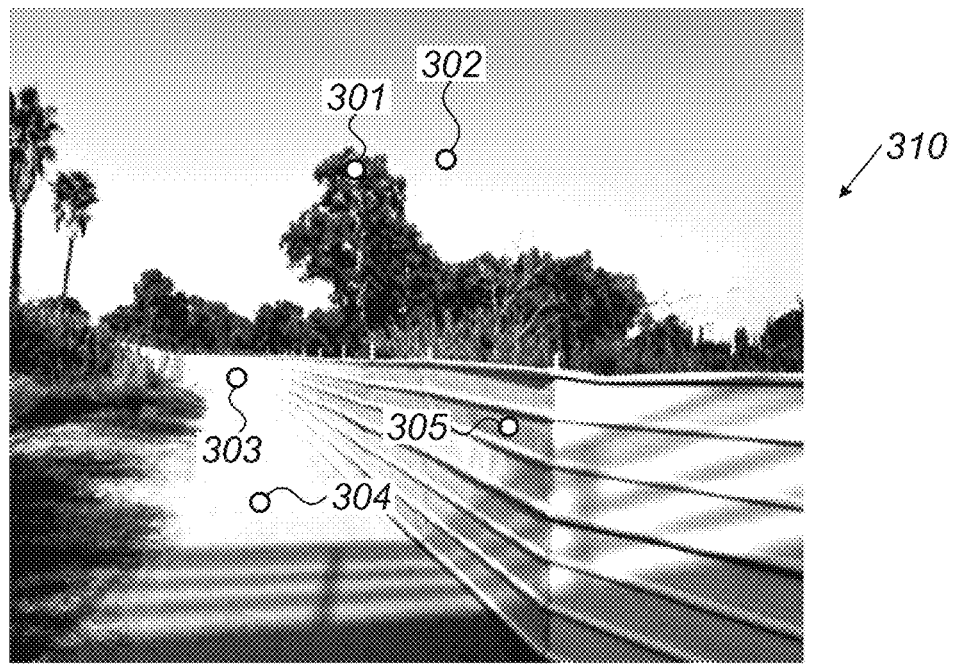
FIGS. 3A and 3B depict an image and a table illustrating a method for conversion from RGB color space values into HSV color space values in hue-based encoding of a digital image, according to embodiments of the invention.

Reference is now made to FIGS. 3A and 3B, which depict an image and a table illustrating a method for conversion of pixel values in hue-based encoding of a digital image, according to embodiments of the invention. Embodiments of the invention may include conversion from RGB representation to HSV representation. FIG. 3A shows an image 310 which includes a plurality exemplary points 301-305, each point located in a different area in image 310 which may be represent a different color and hue. FIG. 3B shows a table 320 which include RGB and HSV values of each of the exemplary points 301-305. Column 321 shows the point number, columns 322-324 shows RGB values and columns 325-327 shows HSV representation values. Column 322 shows R value, column 323 shows G value and column 324 shows B value. Column 325 shows hue (H) value, column 326 shows saturation (S) value and column 327 shows value (V) of HSV representation.

According to embodiments of the invention, conversion from RGB color space values, presented in columns 322-324 of table 320 to HSV color space values, presented in columns 325-327 of table 320 may allow reduced differences between hues and therefore may increase similarity between hues in the image. The conversion from RGB to HSV may be calculated based on known in the art formulas, e.g., the following example formulas indicated [a]-[i] below:

$$R' = R/255 \quad [a]$$

$$G' = G/255 \quad [b]$$

$$B' = B/255 \quad [c]$$

$$C\max = \max(R', G', B') \quad [d]$$

$$C\min = \min(R', G', B') \quad [e]$$

$$\Delta = C\max - C\min \quad [f]$$

[g]: Example hue calculation:

$$h = \begin{cases} 0° & \Delta = 0 \\ 60° \times \left(\frac{G° - B'}{\Delta} \bmod G\right) & , C_{max} = R' \\ 60° \times \left(\frac{B° - R'}{\Delta} + 2\right) & , C_{max} = G' \\ 60° \times \left(\frac{R° - G'}{\Delta} + 4\right) & , C_{max} = B' \end{cases}$$

[h]: Example saturation calculation:

$$S = \begin{cases} 0 & , C_{max} = 0 \\ \frac{\Delta}{C_{max}} & , C_{max} \neq 0 \end{cases}$$

[i]: Example value calculation: V=Cmax

Any other conversion method, or calculation may be used in embodiments of the invention. It should be understood to a person skilled in the art, that in the description of embodiments of the invention, any reference to a pixel value, or an image pixel value may relate to a vectorian representation of a pixel, e.g., in RGB color space or HSV color space. For example, [hue; saturation; value] may correspond to a pixel presented in HSV representation while [R; G; B] may correspond to a pixel presented in RGB representation. An image pixel presented in HSV representation may referred herein also as "hue value" or "hue", although it may indicate values of hue, saturation and value or values of RGB wavelengths in a vectorian representation.

Reference is made back to FIG. 2. In operation 220, a plurality or a group of sample pixels may be selected from the plurality of image pixels. The group of sample pixels may include a plurality of pixels from the digital image data which may be selected in a random selecting process, a semi random selecting process or in a calculated or planned selecting process or method. For example, the plurality of sample pixels may include a randomly selected predetermined percentage of the image pixels, for example, 10%-

30% of the image pixels. Any percentage of the image pixels may be selected, e.g., up to 100% of the image pixels.

In operation 230, a plurality of sample pixels may be clustered; for example, based on an influence function, to generate a plurality of hue clusters. A plurality of hue clusters may be identified by applying clustering operations on the group of sample pixels. The hue clusters may represent leading, significant, primary, dominant or frequent hue values in the image. For example, a leading or a frequent hue value may be a hue value that is detected in a large number of image pixels, e.g., in a number of image pixels that is above a predefined threshold or in a percentage or fraction of the image pixels that is above a predefined threshold. A clustering process may be based on an influence function and may be performed using any applicable method or algorithm, process and/or calculation as described in embodiments of the invention.

Clustering may refer to dividing the plurality of image pixels or the plurality of sample pixels into groups or subgroups of pixels, referred to herein as "clusters" which may be related, linked or associated with a certain value of hue in the image. Hue values of image pixels assigned to a hue a cluster may be more similar to each other than to image pixels from other hue clusters with relation to the features used for clustering, e.g., the HSV color space values. According to embodiments of the invention, hue clusters may represent leading hue values of the digital image. Clusters of image pixels with common, similar, shared or related pixels values may be clustered, e.g., hue-based clusters may include image pixels having a similar, identical or substantially identical hue values, e.g., HSV color space values. Clustering may be performed based on any subset of a plurality of pixels from the image pixels, using any applicable algorithm. The measure of similarity may depend on the specific algorithm used. Clustering methods may include for example, K-means, Gaussian mixture model (GMM), mean shift, spectral clustering, density-based spatial clustering of applications with noise (DB-SCAN), hierarchical clustering, etc., or methods and algorithms as disclosed herein.

In operation 240, the image pixels, e.g., each pixel from the image pixels may be classified or assigned to one or more of the hue clusters, e.g., to a hue cluster from the plurality of the hue clusters identified in operation 230. The pixels from the image pixels that are classified may be from a group of all image pixels excluding the plurality of sample pixels. The plurality of sample pixels may be deleted or removed from the image pixels and may be used for clustering described in operation 230.

According to embodiments of the invention, classifying the image pixels to the plurality of the hue clusters is based on statistical maximum likelihood estimation. The classification process may include matching between a pixel to a cluster based on for example statistical relativity. A statistical likelihood of each pixel's hue may be calculated to determine to which cluster of the plurality of leading hue clusters it may belong. For example, assigning a pixel hue vector to a most relative leading hue cluster, a Maximum Likelihood Estimation (MLE) may be used according to example equation [2]:

$$L(i, k) = -\frac{1}{2} lan(\sum_k) - \frac{1}{2}(Hue_i - Hue_k)^T (\sum_k)^{-1}(Hue_i - Hue_k) \quad [2]$$

Where L(i, k) is a likelihood value, e.g., this value may imply how likely a hue value of a pixel matches a hue value of a hue cluster. Where $\Sigma_k$ is a statistical co-variance matrix of all pixels that belong to a kth group, $Hue_i$ is a hue value of the ith pixel that is assigned to a hue cluster, and $Hue_k$ is a hue of the average kth cluster.

In operation 250, hue values of the hue clusters may be assigned to the plurality of the image pixels. Each image pixel may have hue values assigned to it from the cluster to which it is assigned. A hue value of a hue cluster may be assigned to each image pixel classified to that cluster. All image pixels that may be classified to a certain hue cluster may receive or obtain the hue value of the cluster, e.g., a hue value of a pixel being a center of a cluster which is an average hue of all pixels that belong to the specific cluster. The encoded image may include a reduced number of hues in comparison to the original image. Each hue in the encoded image may represent a typical, unified hue in the image which may represent, for example, a specific element, a certain material, structure and/or a designated area in the image. In some embodiments of the invention, an encoded digital image may represent or display leading hue values of the digital image. The encoded image may be stored by saving the hue cluster value of each pixel from the image pixels.

Reference is made back to FIG. 1B, where encoded image 120 is shown. Encoded image 120 may display the hue cluster value assigned for each pixel from the image pixels. For example, each of sub-areas 125, 126 and 127 may represent a hue value of one of the plurality of leading hue clusters which is determined by the hue-based encoding algorithm as a significant, primary or meaningful hue in image 120.

According to embodiments of the invention, the unsupervised encoding process may include reconstructing an image based on the finite number of hues found in the clustering process. For each pixel in the image, the closer hue cluster may be detected, and a pixel may be assigned to that cluster by receiving the hue of the cluster.

Embodiments of the invention may suggest an innovative clustering approach. According to embodiments of the invention, each pixel from the plurality of sample pixels may be perceived as producing one unit of "influence" that is induced to a pre-defined radius of influence also referred to herein as a "cluster radius". The influence absorbed by each of the other sample pixels may be summed, and pixels with high amount of influence may be selected to be a potential center of cluster.

Figure 4:
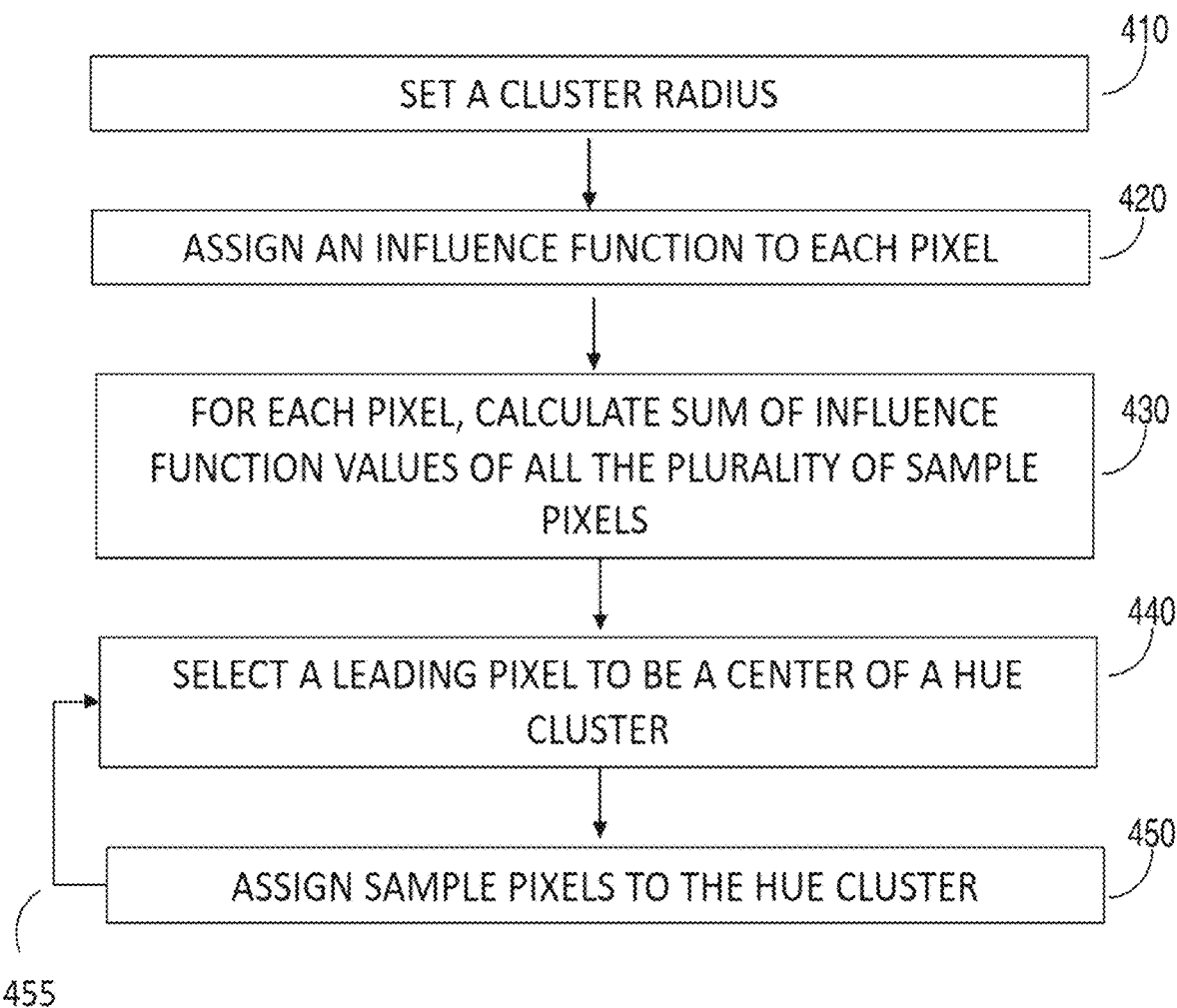
FIG. 4 is a flowchart of a method for hue-based clustering of a digital image, according to embodiments of the invention.

Reference is made to FIG. 4, which is a flowchart of a method for hue-based clustering of a digital image, according to embodiments of the invention. The clustering operations described herein may be performed with, may comprise, or may further define operation 230 of FIG. 2, where clustering the plurality of sample pixels based on an influence function to generate a plurality of hue clusters and a plurality of leading hue clusters may be identified in accordance with embodiments of the invention. An embodiment of a method for hue-based clustering of a digital image may be performed, for example, by the systems shown in FIG. 11.

In operation 410, a cluster radius may be set, selected, defined or determined. A cluster radius, also referred to herein as "influence radius" or "radial distance" or simply "a radius" may be set, determined or selected according to parameters or characteristics of the image, arbitrarily or based on predefined choices. The cluster radius may be a predefined distance, e.g., Euclidean distance or distance in units of pixels defined from a location in a three-dimensional (3D) color space coordinate system of a pixel in the HSV color space. According to embodiments of the invention in a three-dimensional hue axis system, e.g., such as the HSV color space, a cluster radius may be used to define a sphere around a location, or a position of a pixel also referred to herein as "cluster center" which may serve as an origin or center of a sphere defined by the cluster radius. As used herein a position, location and distance of a pixel may describe a position, location and distance of a hue of the pixel in a three-dimensional hue axis system, such as the HSV color space (e.g., as the 3-dimensional axis system depicted in FIGS. 5A and 5B).

A cluster radius may be set for each axis of the coordinate system and therefore an exemplary spheric radius in a 3D color space coordinate system may be calculated according to example equation [3]:

[3] $r = \sqrt{r_x^2 + r_y^2 + r_z^2}$ where r is the cluster radius, $r_x$ is the radius set in x axis, $r_y$ is the radius set in y axis and $r_z$ is the radius set in z axis. The value of the cluster or influence radius may be predefined and may be set based on a plurality of parameters, e.g., a number of pixels, number of hues in the image or any other parameter. According to embodiments of the invention, a cluster radius may be arbitrarily set to a first distance, e.g., 5, 10 or 15 color units and may be modified according to the results of the clustering process. Other influence radiuses may be used.

In some embodiments of the invention, an influence radius may be adjusted based on clustering results, for example, if clusters that are too large are obtained during the clustering process, e.g., clusters having a number of image pixels that is above a predefined threshold, clustering operations may be repeated with a smaller influence radius, and if clusters that are too small are obtained, e.g., clusters having a number of image pixels that is below a predefined threshold, clustering operations may be repeated with larger influence radius.

In operation 420, an influence function may be assigned to each pixel of the plurality of sample pixels. According to embodiments of the invention, the influence function may be maximal at a position or a location of a pixel and may decay along the cluster radius around the position of the pixel. In some embodiments, the influence function may be constant (e.g., equal a constant value) along a cluster radius or influence radius around the position of the pixel, and be set to zero elsewhere. For example, the influence function may be maximal at a position of the pixel and may decay gradually, e.g., linearly, exponentially, etc., along a cluster radius or influence radius around the position of the pixel. Other influence functions may be used.

In operation 430, for each pixel of the plurality of sample pixels, a sum of influence function values of all the plurality of sample pixels may be calculated. A sum of the influence function values of all sample pixels may be calculated, accumulated, summed, or otherwise combined per position of each of the sample pixels. The value of the influence function may be calculated for each of the sample pixels with relation to all other sample pixels. A sum of all the calculated influence function values may be calculated for each pixel.

According to embodiments of the invention, the influence function may be assigned to each pixel from the sample pixels and a sum of influence function values of all the plurality of sample pixels may be calculated with relation to a position of each pixel from the sample pixels, e.g., in a three-dimensional hue axis system, such as the HSV color space. The influence function may be related to a distance from a pixel position or location (in the three-dimensional hue axis system, e.g., the HSV color space), therefore the influence function value may be maximal at a position or a location of a first pixel and may decay along the cluster radius around the position of that pixel. Pixels which are distant from the first pixel may have minimal influence, e.g., zero or a value close to zero on the sum of influence function values calculated for the first pixel. In some embodiments, for each sample pixel a sum of influence function values of all other sample pixels may be calculated. In other embodiments, for each sample pixel a sum of influence function values of sample pixels located within a predefined distance, e.g., within a sphere defined by the cluster radius, from the sample pixel may be calculated. Sample pixels located in a distance larger than the cluster radius from a first pixel may not affect or may have minimal influence on the sum of influence function values calculated for the first pixel.

Therefore, in some embodiments of the invention, all pixels from a group of sample pixels located within a sphere having the cluster radius around a selected pixel may be identified as sample pixels that may have influence on the selected pixel. The group of pixels may contain all the pixels from the sample pixels which may be located, positioned or found within a 3-dimensional sphere-shaped space or area defined around the selected pixel in the three-dimensional hue axis system, e.g., the HSV color space. The origin of the sphere is the location of the selected pixel and the cluster radius assigned in operation 410 defines the radius of the 3-D sphere around the selected pixel. All sampled pixels which may be found in the area defined by that sphere, also referred herein as "influence sphere" may be considered as pixels which based on them a hue cluster may be defined, according to embodiments of the invention.

According to embodiments of the invention, the influence function may be calculated with relation to a position of each of the pixels from the plurality of sample pixels in the three-dimensional hue axis system, e.g., the HSV color space. Therefore, when calculating the influence function value for a first selected pixel, the influence function value of the selected pixel may equal 1 or 1 unit. The influence function may be related to a distance from a pixel and may be calculated according to example formula [4]:

$$\text{Energy value} = \frac{1}{\text{distance}} \quad [4]$$

wherein the distance is a relative distance of a selected pixel, e.g., from the first pixel, selected as the origin of the 3D sphere. As with other formulas described herein, different formulas may be used.

The influence function value for each of the sample pixels may be calculated, e.g., a sum of influence function value of all the sample pixels with relation to a location or a position of each sample pixels. In some embodiments, an influence function may be assigned to each of the sample pixels found within a sphere having a cluster radius around a selected pixel. The influence function value may be relative to, based on or influenced by the distance of each pixel from the position of the selected pixel, e.g., the middle or center of the sphere.

In some embodiments, the influence function may be maximal at a position of a pixel and may decay gradually, e.g., linearly, exponentially, etc., along a cluster radius or influence radius around the position of the selected pixel. For example, the influence function may be maximal at the x-y-z location of the selected pixel from the sample pixels. Other influence functions may be used. For example, the influence function may be constant (e.g., equal a constant value) along a cluster radius or influence radius around the position of a pixel, and be set to zero elsewhere.

According to embodiments of the invention, pixels may be assigned to clusters based on the combined influence values. Assigning the plurality of sample pixels to hue clusters based on the sum of influence function values may include an iterative process that may be repeated until all sample pixels are assigned to a hue cluster.

In operation 440, in each iteration, a leading pixel from the plurality of sample pixels with a highest sum of influence function values, that is not yet assigned to a hue cluster may be selected to be a center of a hue cluster. A leading pixel may be a pixel of the plurality of sample pixels with the highest summed influence value, e.g., a pixel with the highest accumulated sum of influence values of all sample pixels or of sample pixels located in a predefined distance from the leading pixel. The leading pixel may be identified or determined based on the sum of the influence function values of all sample pixels or sample pixels within a sphere having a cluster radius around the position of the leading pixel. When a leading pixel is defined or assigned to be a center of a cluster, the location or position of the leading pixel may be defined and serve as a center or origin of a 3-D sphere around that location.

According to embodiments of the invention, a pixel that may achieve the highest sum of energy function values with relation to all the other sample pixels may be defined as a center of a cluster and his hue value, e.g., its hue vector in HSV space color, may be set as a leading hue cluster value. For example, a first leading pixel which may be set as a center of a hue cluster may have the most frequent hue in the image, according to embodiments of the invention.

In operation 450, a plurality of sample pixels may be assigned to hue clusters based on the sum of influence function values. When a leading pixel is selected as a center of a hue cluster, sample pixels located within a sphere having a cluster radius around the position of the leading pixel may be assigned to the hue cluster which the leading pixel is its center. All pixels from the plurality of sample pixels with a distance lower than the influence or cluster radius from the leading pixel may be assigned to that cluster.

All pixels from the plurality of sample pixels located within a 3D sphere having a cluster radius around the cluster center may be assigned to the hue cluster. According to embodiments of the invention, a hue value of the leading pixel may be set as the hue cluster value of the hue cluster. All pixels from the group of sample pixels that may be assigned to the leading hue cluster may receive or get the hue value of the leading pixel. Pixels assigned to a hue cluster may be removed, discarded, or deleted from the sample pixels and another iteration of operations 440 and 450 may be repeated, as indicated by arrow 455, until all sample pixels are assigned to a hue cluster.

The clustering process, e.g., assigning pixels from the sample pixels to clusters may be an iterative process that may be repeated until all sample pixels are assigned to a cluster. In each iteration, a position, e.g., of a pixel with the highest summed influence function value, that is not yet assigned to a cluster, may be selected to be a center of a cluster, and all pixels with a distance lower than the influence radius from the selected pixel may be assigned to the cluster. A hue value of the leading pixel may be set as a hue value of the hue cluster and all sample pixels assigned to a hue cluster may receive that hue value.

In some embodiments, adjacent clusters may be united or combined to form a single cluster. This may improve the clustering process since adjacent clusters may share common content and therefore may be united. For example, if the distance between two clusters is lower than a threshold, e.g., 1.5 times the influence radius, than the clusters may be united to a single cluster. The distance may be Euclidean distance or a statistic distance such as Mahalanobis distance, e.g., a distance of a cluster radius and the distribution of image positions in a second cluster.

According to embodiments of the invention, when all sample pixels are assigned to a cluster of the plurality of leading hue clusters, there are a plurality of leading hue clusters. Each cluster of the plurality of the leading hue clusters represent a hue derived from the image. The hue which may be assigned to each of the plurality of leading hue clusters may be an average hue of all the pixels that were assigned to that cluster.

In some embodiments of the invention, statistical parameters of each of the clusters may be obtained, acquired and calculated. For example, an average vector, a variance matrix, co-variance matrix may be calculated for each hue cluster. Other parameters may be calculated or achieved.

Figure 5A:
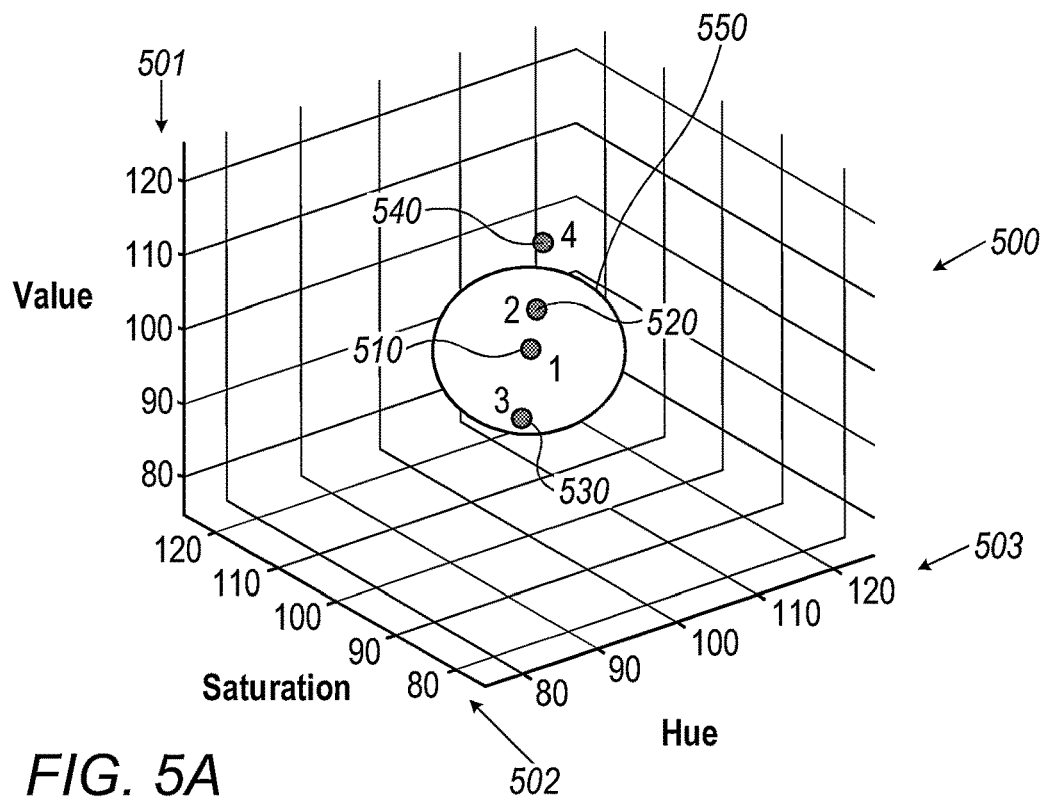
FIGS. 5A and 5B depict influence spheres positioned in an exemplary 3-dimensional axis system for hue-based clustering, according to embodiments of the invention.
Figure 5B:
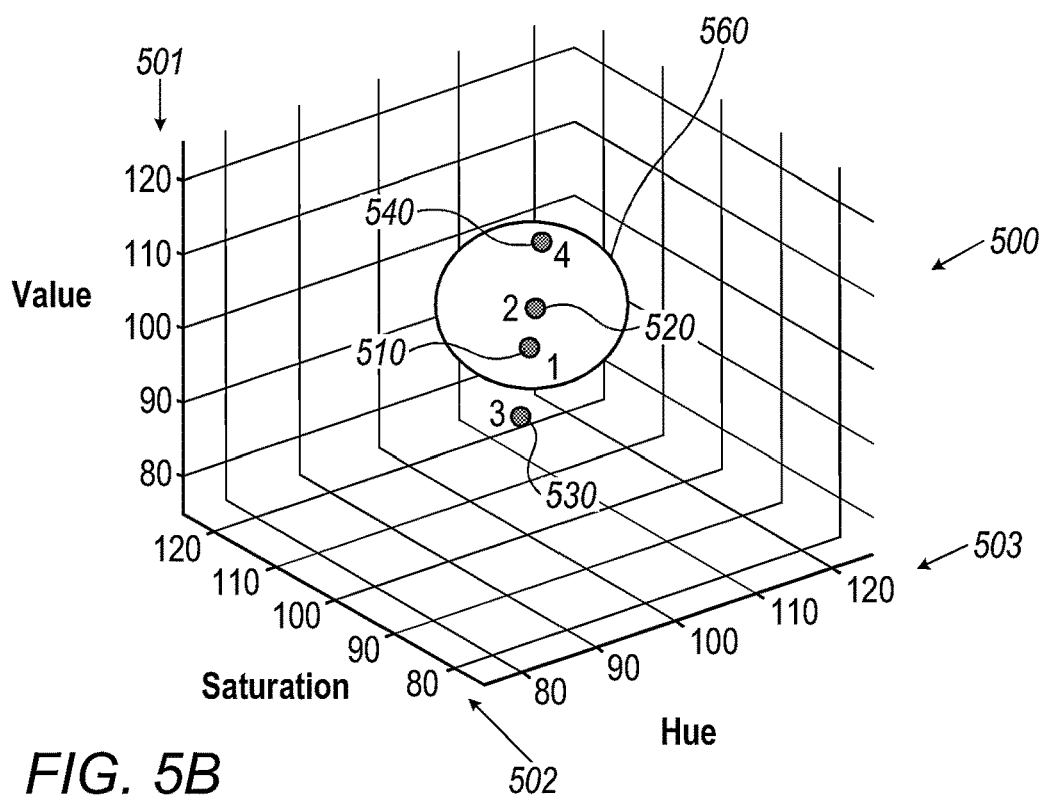

Reference is now made to FIGS. 5A and 5B which depict influence spheres positioned in an exemplary 3-dimensional axis system for hue-based clustering, according to embodiments of the invention. Each of FIGS. 5A and 5B depicts a 3-dimensional cartesian axis system 500 which represent HSV color model. System 500 may include a value axis 501, a saturation axis 502, and a hue axis 503 of HSV color representation. Both FIG. 5A and FIG. 5B shows identical four pixels 510, 520, 430 and 540 which are shown in system 500. The HSV values of pixel 510 are [100, 100, 100], the HSV values of pixel 520 are [103, 103, 103], the HSV values of pixel 530 are [95, 95, 95] and the HSV values of pixel 540 are [108,108,108]. FIG. 5A shows an influence sphere 550 having a radius of 10 which its origin or center is pixel 510 and FIG. 5B shows an influence sphere 560 having a radius of 10 units which its origin or center is pixel 520.

In the exemplary illustration of FIG. 5A, when a sum of influence function values is calculated for pixel 510, pixel 510 may serve as an origin of sphere 550. Pixels 510, 520 and 530 are located within sphere 550 and may contribute to the accumulated influence function value of pixel 510 in the clustering process. Pixel 540 is not located within sphere 550 and therefore may not contribute to the accumulated influence value of pixel 510 in the clustering process.

In the exemplary illustration of FIG. 5B, the same group of sample pixels as in FIG. 5A may be used. When a sum of influence function values is calculated for pixel 520, pixel 520 may serve as an origin of sphere 560. Pixels 510, 520 and 540 are located within sphere 560 and may contribute to the accumulated influence value of pixel 520 in the clustering process. Pixel 530 is not located within sphere 560 and may not contribute to the accumulated value of pixel 520 in the clustering process.

In FIG. 5A, the sum of influence function values may be calculated with relation to the position of pixel 510 within sphere 550. Therefore, the influence function value of pixel 510 may equal 1 or 1 unit. The influence function of pixel 520 and pixel 530 may be calculated according to formula $$\text{Energy value} = \frac{1}{\text{distance}} \qquad [4]$$

wherein the distance is the relative distance of the pixel from the pixel selected as the origin of the sphere, e.g., pixel 510 in FIG. 5A and pixel 520 in FIG. 5B.

The sum of distances of pixels 520 and 530 from pixel 510 in FIG. 5A is smaller than the sum of distances of pixels 510 and 540 from pixel 520 in FIG. 5B, therefore the accumulated influence function values of pixel 510 may be higher than the accumulated influence function values of pixel 520. In the exemplary illustration of FIGS. 5A and 5B, pixel 510 may be identified as a cluster center and may be selected to be a center of a hue cluster as described in operation 440 of FIG. 4. Pixels 520 and 530 may be assigned to that cluster as described in operation 450 of FIG. 4, as they are located within sphere 550. Pixel 540 may not be included in that cluster as it is located outside the spherical influence radius of pixel 510. Pixel 540 may be clustered or serve as a cluster center in a next iteration.

According to embodiments of the invention, the hue-based encoding methods may be used for a variety of uses, e.g., clustering digital images based on encoded hue information, detecting overlapping areas between two or more digital images, co-registering overlapping images, retrieving information within an image by detecting objects and features in one or more digital images, calibrating overlapping areas based on image hues, compressing unnecessary information in a digital image and encoding a plurality of images into a unified image having improved or best characteristics, also referred to herein as "mosaic".

A mosaic is an image which may consist of the best possible fusion of a plurality of images, including a combined metadata information. Metadata information may describe or include any information related to the image, e.g., descriptors or values describing characteristics, qualities or attributes of the image. For example, metadata may include or represent time features, e.g. image capture time and date from a camera, location features, e.g., features related to a location in which the image was taken, and quality features, e.g., features related to measures of quality of the image, e.g., brightness, sharpness, illumination, focal length, rear\front camera etc. Some of the metadata features may be measured and logged during image acquisition while other metadata features may be provided by the system (e.g., applications of a smartphone) and from connected devices that may provide information about the image.

Embodiments of the invention may use hue-based encoding operations for detecting overlapping areas within two or more images into a common mosaic image. In some embodiments of the invention, images that were captured at a same location in different times and different illumination conditions may have similar elements, however, may have different set of hues for common objects and features in the overlapping area, due to changes in, light, shadow, self-initial calibration parameters, etc.

In some embodiments, a unified mosaic may include local areas, regions marked for example as polygons that may represent region of interests (ROI) that may indicate identical content or differential content in the digital image. Each ROI in each of the overlapping images may be scored, e.g., based on a scoring function, to decide whether it is feasible to compress the duplicated data and to create a unified mosaic, e.g., that may match one or more preferences defined by a user or by an automatic system. The scoring function may be based on one or more inputs, for example, scoring given by commercial off-the-shelf (COTS), quality score by predefined parameters. Exemplary scoring functions may be based on contrast, brightness, blurring or any other parameter. Any scoring function may be used, and any other input and/or parameter or a combination of inputs and/or parameters may be used for determining the scoring function.

Figure 6A:
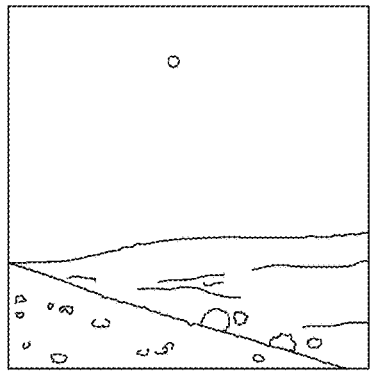
FIGS. 6A-6D are pictorial illustrations of original images and a unified mosaic image, according to embodiments of the invention.
Figure 6B:
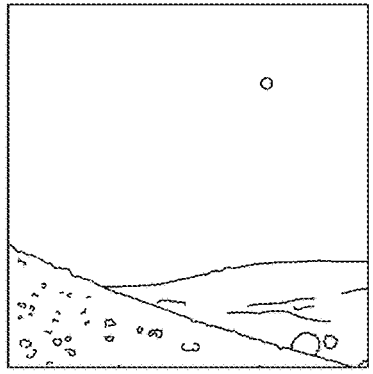
Figure 6C:
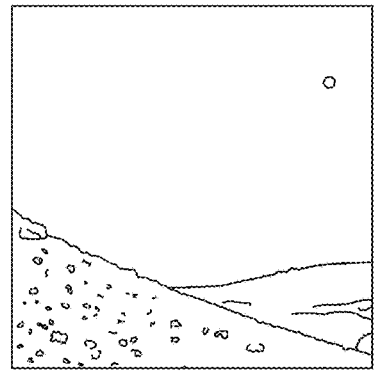
Figure 6D:
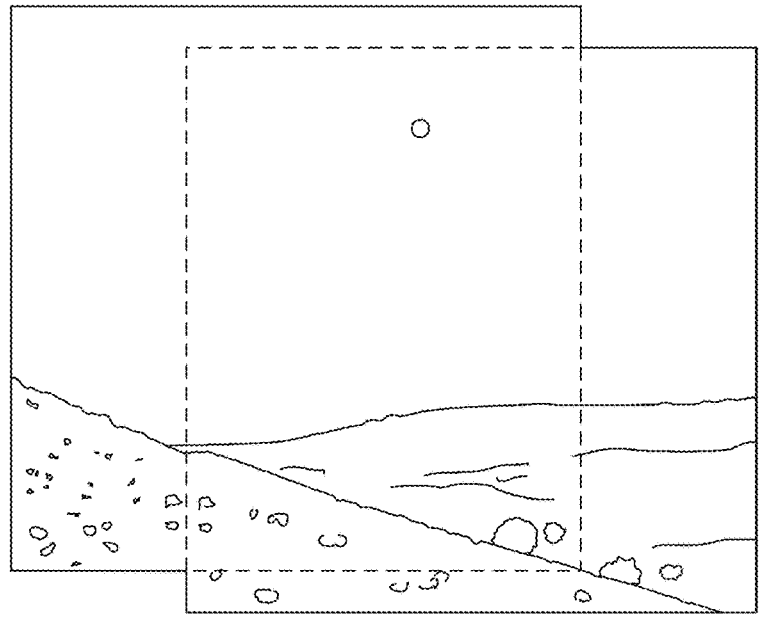

Reference is made to FIGS. 6A-6D which are pictorial illustrations of original images and a unified mosaic image, according to embodiments of the invention. FIGS. 6A, 6B and 6C depict three images with an overlapping area. According to embodiments of the invention, a hue-based encoding process may be applied on images of FIGS. 6A-6C to create or generate a mosaic image, e.g., FIG. 6D. Instead of storing a plurality of fully sized images with overlapping areas, e.g., FIGS. 6A-6C, embodiments of the invention may utilize the spatial overlapping information based on spatial co-registration and clustering processes and may create an indexed or coded mosaic image as shown in FIG. 6D. In some embodiments of the invention, FIGS. 6A-6C which have overlapping areas may be stored separately with a high level of compression factor while the mosaic image FIG. 6D may be stored without any compression factor.

According to embodiments of the invention, the plurality of images may be co-registered and spatially encoded into a unified mosaic image. Then radiometric information (e.g., the hue value at the HSV color space) of each image may be subtracted from the common radiometric information of the mosaic image. Eventually, each pixel that equals zero after subtraction, may be saved only once, and may be reconstructed later from the mosaic image, e.g., using COTS capabilities. Any other method may be used to reconstruct the original image. Each image may be reconstructed to the exact resolution as the original image accurately and efficiently based on the mosaic image and parameters of a relative radiometric calibration process (e.g., a process that brings two or more images into a unified hues scale). In some embodiments, advanced deduplication algorithms which may utilize spatial, overlapping and spectral information affiliated in each cluster may be used. Those algorithms may use multi resolution analysis, e.g., wavelet transform, to define a finite and common set of hues from all images consisted the common mosaic.

Some embodiments of the invention may include an advanced co-register process. The hue information may be transformed into mathematical and physical domains, e.g., by Principal Component Analysis (PCA) and multi resolution analysis in order to sharpen edges of objects in the scene and to refine the uniqueness of object's hues. Other solutions may use content detections algorithms, provided in a computer vision library of mobile devices, e.g., proprietary or COTS computer vision tools, to detect the content of images Some embodiments of the invention may include a relative radiometric calibration process (e.g., hue adjustment between two or more images) which may bring two or more images into a unified hues scale in order to detect common areas, partial common areas, and/or identical information between overlapping images. The relative calibration process may match between one or more hues of detected common objects within an overlapping area between two or more images by normalizing a first set of hues of a first image into a second set of hues of a second image.

Embodiments of the invention may include change detection in overlapping areas to detect local changes within the overlapping areas. After being co-registered, each corresponding pixel should represent the same spatial object (hue). Subtracting the corresponding hues should indicate of a spatial change in the scene. If the subtraction results close to zero, it means that the two hues are the same representing the same spatial object. If the absolute value of the subtraction results is significantly greater than zero (e.g., the subtraction results satisfy or exceed a threshold), it means that there was a spatial change, thus another object presents in the scene.

Embodiments of the invention may use hue-based encoding methods for hue adjustment between two or more images (also referred to as relative radiometric calibration). As described with relation to some embodiments of the invention, images that were captured at a same location in different times and different illumination conditions may have similar elements with different set of hues for common objects and features in the images, due to changes in light, shadow, self-initial calibration parameters, etc. Therefore, hue adjustment between two or more images may be used.

Figure 7:
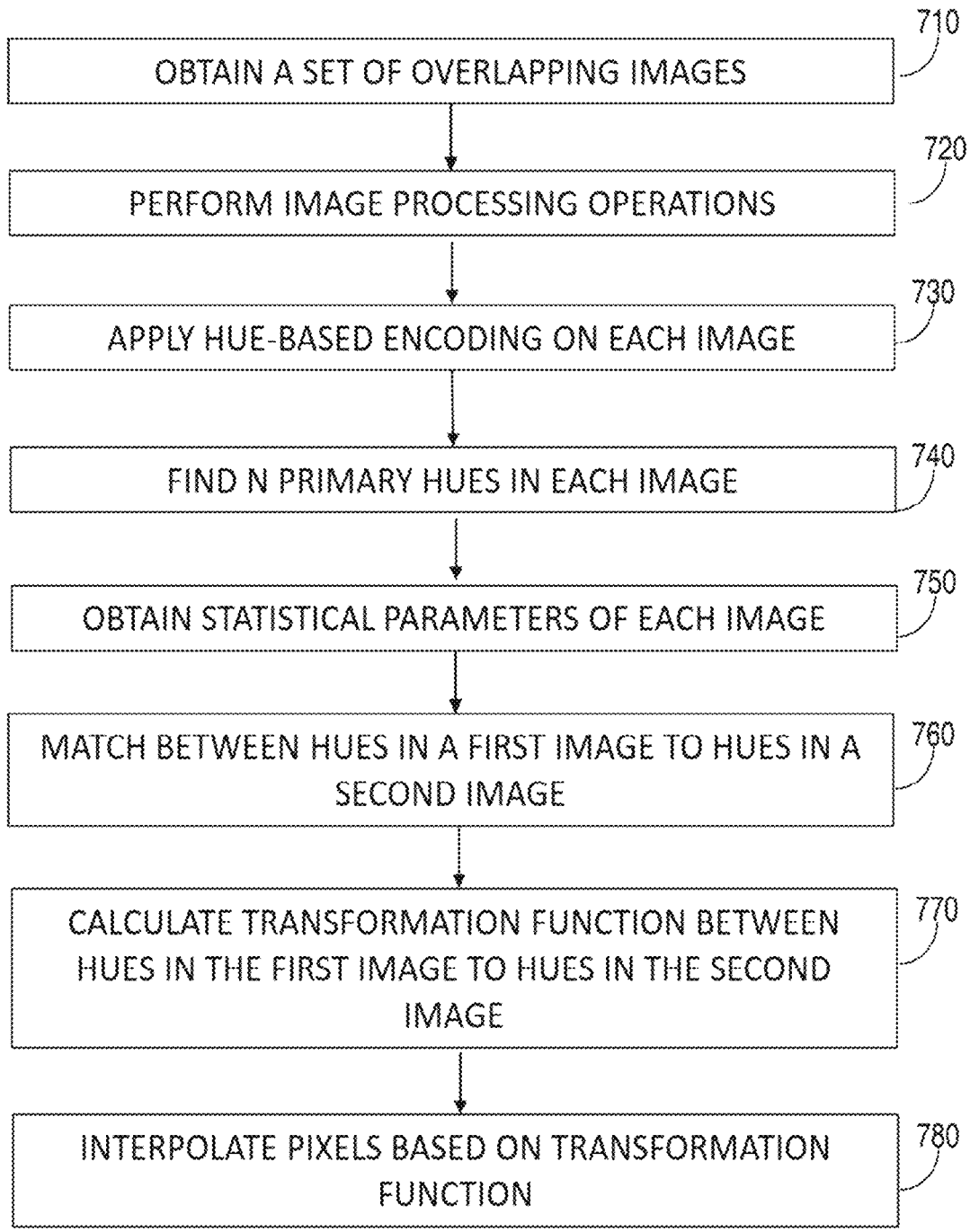
FIG. 7 is a flowchart of a method for hue-based adjustment of a digital image, according to embodiments of the invention.

Reference is made to FIG. 7, which is a flowchart of a method for hue-based adjustment of a digital image, according to embodiments of the invention. Some of the operations of FIG. 7 may be related or may be similar, analogues and/or may match operations described in FIG. 2 and/or FIG. 4. An embodiment of a method for hue-based adjustment of a digital image may be performed, for example, by the example system shown in FIG. 11. As with other method flowcharts, operations of FIG. 7 may be used with operations in other flowcharts shown herein in some embodiment of the invention.

In operation 710, image data of a set of overlapping digital images, e.g., two or more overlapping images, may be obtained, e.g., from a sensor. Each digital image may include plurality of image pixels and metadata related to the plurality of digital images. Obtaining a set of images may include two or more digital images that may have been taken or captured at the same location and/or at the same time, e.g., in a single burst, one after the other and therefore may have similar content, overlapping areas, elements, textures, hues and the like. Obtaining a set of images may include saving the image data in a memory, e.g., memory 1120 of FIG. 11, storage 1130 of FIG. 11 or image file 1132 of FIG. 11.

In operation 720, image processing operation may be performed. Digital processing operations may be performed by one or more systems or elements of FIG. 11. In some embodiments the DN value of each pixel, which may represent an arbitrary relative amount of light reflection, may be interpolated. The interpolation may be done by stretching the highest energy level in the image into maximum brightness value, e.g. in 8-bit representation, the maximum brightness value is set to 255. The minimum energy level in the image is set to zero. In some embodiments, the highest DN value may be set to the number of hues in the image, e.g., 255 and the lowest DN value may be set to zero. All other hues may be interpolated accordingly, e.g., linearly stretched to calibrate all pixel values into hues representation. Transforming the DN value into a hue value may be performed according to formula [1], as described in embodiments of the invention. Embodiments of the invention may include conversion from RGB representation to HSV hue representation, e.g., as known in the art.

Figure 8A:
FIGS. 8A-8E are pictorial illustrations of images representing stages of a hue-based adjustment method, according to embodiments of the invention.
Figure 8B:
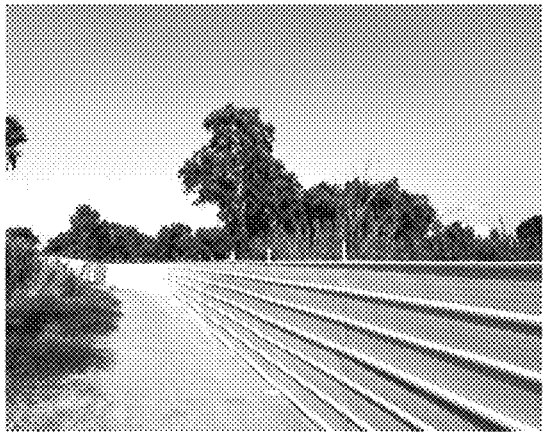

Reference is now made to FIGS. 8A-8E which are pictorial illustrations of images representing stages of a hue-based adjustment method, according to embodiments of the invention. FIG. 8A and FIG. 8B are digital images from a set of images that were taken at a similar location at different times and are therefore show some level of similarity. FIG. 8A also referred to as "a first image" or "image one" and FIG. 8B also referred to as "a second image" or "image two". FIG. 8A may include darker areas 810 which may include darker hues in comparison to FIG. 8B, due to different light conditions at the time of capturing the images.

Reference is now made to Figs. FIGS. 9A and 9B, which depict tables of hue values related to images in a hue-based adjustment method, according to embodiments of the invention. In some embodiments of the invention, the image processing operations indicated by operation 720 may include conversion from RGB representation to HSV representation. FIG. 9A includes three tables 910, 920 and 930. Table 910 shows RGB hue values representation of five different areas in image one, namely in FIG. 8A. Table 920 shows RGB hue values representation the five areas, as in table 910 in image two, namely in FIG. 8B. Table 930 shows the difference between the RGB hue values of FIG. 8A and FIG. 8B. The subtraction column of table 930 shows that RGB hue values which may represent the same area in each image differ from each other, e.g., in a nonlinear manner Hence, it may be almost impossible to imply hues comparison between the images, which may lead to unsuccessful deduplication process to reduce common information. Therefore, embodiments of the invention may transform or convert the hue values from RGB color space representation to HSV color space representation shown in FIG. 9B.

FIG. 9B includes three tables 915, 925 and 935. Table 915 shows HSV hue values representation of five different areas in of image one, namely FIG. 8A. Table 925 shows HSV hue values representation the five areas, as in table 915 in image two, namely FIG. 8B. Table 935 shows the difference between the HSV hue values of FIG. 8A and FIG. 8B. The subtraction column of table 935 shows the overall difference between hue values in HSV color space were reduced in comparison to the RGB subtraction column of table 930, hence the similarity between hue values in HSV color space may be higher.

In operation 730, a hue-based encoding may be applied to each image of the set of images. The hue-based encoding which may be applied may be similar to the encoding process described with reference to FIG. 2 and FIG. 4. During the encoding process, a clustering process or algorithm to find meaningful or primary hues in each of the images of the set of images may be applied, e.g., as described in FIG. 4. For example, the clustering may include, setting a cluster radius, assigning an influence function for each pixel in each of the images of the set of images, summing the influence function values of each of the pixels in each of the images and finding a pixel which may achieve a highest influence value. The pixel with the highest sum of influence values may be set as a center of a primary or a first cluster. Other pixels having HSV hue vectors that may be within a predetermined sphere or below/above other predetermined threshold may be assigned to the first cluster. All pixels that are assigned to a cluster may be removed from a list of all pixels in the image. The above operation of the hue-based encoding may be repeated until all pixels of the image are assigned to a cluster. Any other clustering algorithm or clustering operations may be used.

Figure 8C:
Figure 8D:
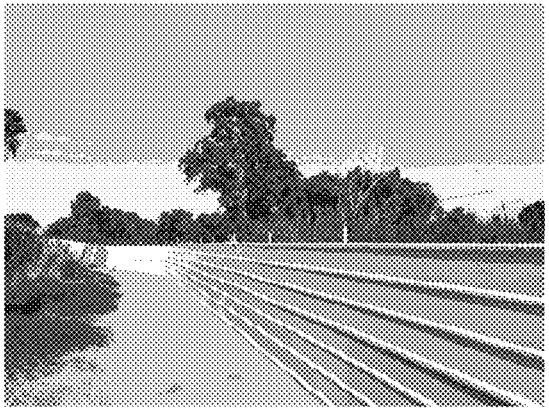

Reference is made back to FIGS. 8C and 8D which are pictorial illustrations of reconstructed images encoded by a hue-based encoding, according to embodiments of the invention. FIG. 8C shows an encoded version of FIG. 8A and FIG. 8D shows an encoded version of FIG. 8B. Both reconstructed images shown in FIGS. 8C and 8D presents 128 hue clusters as a result of a hue-based encoding process. Each pixel of the images of FIGS. 8A and 8B may be assigned to one of 128 hue clusters and the hue value is presented in FIGS. 8C and 8D, respectively.

In operation 740, a plurality of N primary hues of each image of the set of images may be selected, wherein N is a positive integer. For example, a number of N primary, main, meaningful, major and/or dominant hues may be selected from the first encoded image, e.g., FIG. 8C and from the second encoded image, e.g., FIG. 8D.

In operation 750, statistical parameters of each of the N hue clusters may be obtained, acquired and/or calculated. For example, an average vector, a variance matrix, co-variance matrix may be calculated for each of the selected N hue clusters of each of the images. Other parameters may be calculated, analyzed or evaluated.

In operation 760, hues in a first image may be matched to hues in a second image. For example, the encoded hues from the first encoded image, e.g., FIG. 8C may be matched to encoded hues from the second encoded image, e.g., FIG. 8D. According to some embodiments of the invention, matching may be performed, for example, by a classification process which may include calculating a statistical likelihood of each encoded hue selected in the first image to belong or match any of the encoded hues selected in the second image. The i-th hue from the first image may be assigned to a k-th hue from a second image that scored the highest likelihood value. Any other method or technique of image classification for assigning a pixel vector into a categorized group or cluster may be used.

In some embodiments MLE may be used according to equation [5], as described with reference to FIG. 2:

$$L(i, k) = -\frac{1}{2} lan(\sum_k) - \frac{1}{2}(Hue_i - Hue_k)^T (\sum_k)^{-1}(Hue_i - Hue_k) \quad [5]$$

Where L(i, k) is a likelihood value, e.g., this value may imply how likely i-th hue from the first image may be assigned to a k-th hue from a second image. Where $\Sigma_k$ is co-variance statistical matrix of all hues for the kth group in destination image, e.g., a second image, $Hue_i$ is the ith group in the source image, e.g., the first image and $Hue_k$ is the kth group in destination image, e.g., the second image.

In operation 770, a transformation function between hues in a first image to hues in a second image may be calculated. Embodiments of the invention may include replacing hues from the first image with their corresponding hues in the second image. In some embodiments of the invention, calibration process may be performed in order to reconstruct an image using transformation parameters from hues of a first image to the second image as indicated in equation [6]:

$$Hue_{source} = a * Hue_{destination} + b \quad [6]$$

Where a, b, and c are parameters calculated based on hue vectors.

Figure 8E:

In operation 780, all image pixels from the first, e.g., source image may be interpolated according to the transformation function, e.g., presented by equation [4]. Reference is made now to FIG. 8E which shows reconstructed original image two (FIG. 8B) using hues of original image one (FIG. 8A). In some embodiments of the invention, spectral angular mapper (SAM) distance may be calculated in order to increase the reliability of the results of MLE techniques after transforming HSV color space according to the following equation [7]:

$$SAM\ DISTANCE = \frac{VEC_{SOURCE} \cdot (VEC_{DESTINATION})^{TRANSPOSE}}{NORM(VEC_{SOURCE}) \cdot NORM(VEC_{DESTINATION})} \quad [7]$$

-continued

Where: $VEC_{SOURCE}$ = source image vector in HSV color space, [H S V] and $VEC_{destination}$ = destination image vector in HSV color space, [H S V].

According to some embodiments of the invention, if the calculated SAM distance is greater than the sum of standard deviation value (STD) of each cluster, then the matching found based on MLE may be cancelled and it may be determined that the hues detected may be unique in each of the first and second images and may not exist in the other image. If, however, the calculated SAM distance is not greater than the sum of standard deviation value (STD) of each cluster, then the matching found based on MLE may be considered reliable. According to some embodiments of the invention, an encoded image may be also further compressed using other compression methods, e.g., Huffman encoding or other COTS techniques.

Figure 10A:
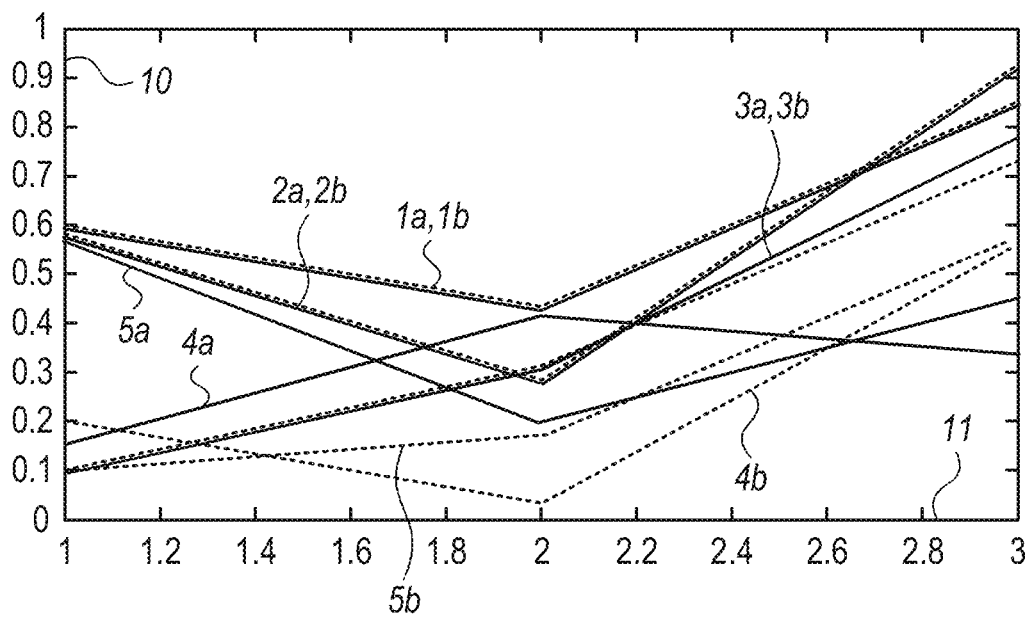
FIGS. 10A and 10B depict exemplary graphs of hue values related to images in a hue-based adjustment method, according to embodiments of the invention.
Figure 10B:
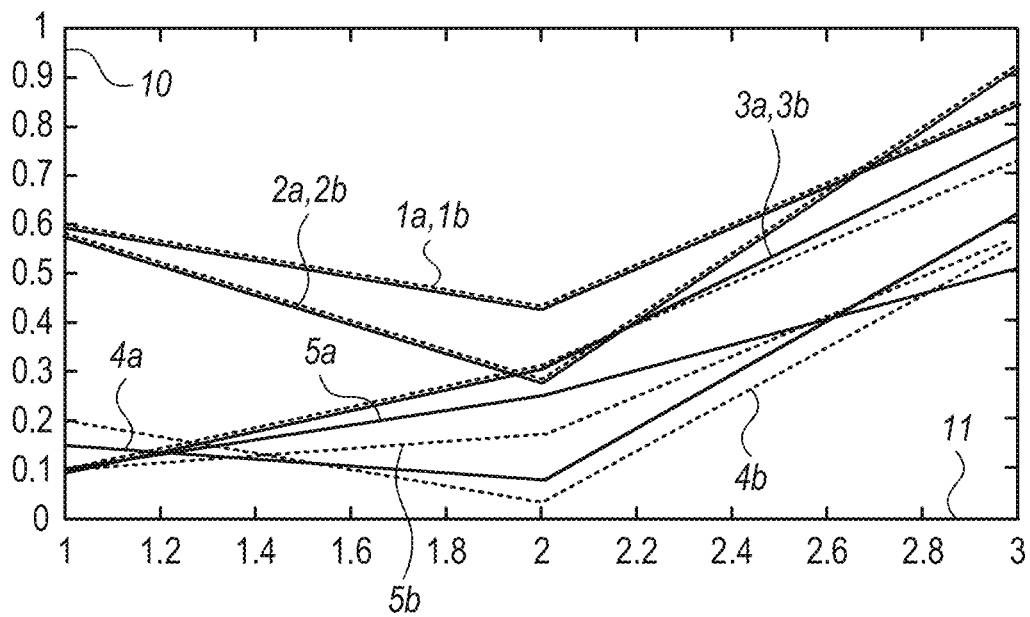

Reference is made to FIGS. 10A and 10B which depict exemplary graphs of hue values related to images in a hue-based adjustment method, according to embodiments of the invention. Each of FIGS. 10A and 10B shows exemplary 5 most frequent hues in HSV or RGB color space for a first image or source images, and for a second image or destination image. The values shown may be calculated based on the hue-based encoding of embodiments of the invention. In FIGS. 10A and 10B, a horizontal (x) axis 11 may represent HSV values and vertical (y) axis 10 may represent the value of the H, S or V coordinate correspondingly. Each line of lines 1*a*-5*a* may represent a hue in the source image and each line of lines 1*b*-5*b* may represent a hue in the destination image.

In FIG. 10A and FIG. 10B, the lines representing hues 1, 2 and 3 may show high level of similarity as hue 1*a* coincides with hue 1*b*, hue 2*a* coincides with hue 2*b* and hue 3*a* coincides with hue 3*b*. This shows a high similarity or match between hues in a first image "a" to hues in a second image "b". As further shown in FIG. 10A, hue 4*a* may not coincides with hue 4*b* and hue 5*a* may not coincides with hue 5*b*, therefore there is no match between hues 4 and 5 of the source and destination images before matching hues between source and destination images. FIG. 10B shows the same 5 hues from the first image "a" and the best matched hues from the second image "b" after hue-based adjustment process performed on source and destination images, e.g., as described with reference to FIG. 7.

FIG. 10B shows an improved match between all 5 hues from both images, in addition to hues 1-3, in FIG. 10B hue 4*a* almost coincides with hue 4*b* and hue 5*a* almost coincides with hue 5*b*. Although difference between hues 1*a* and 1*b*, 2*a* and 2*b* and 3*a* and 3*b* in both images may show minimal difference, the difference between hues 4*a* and 4*b* and 5*a* and 5*b* is greater, e.g, after a matching process based on MLE Other embodiments of the invention may use the hue-based encoding process for creation of a synthesized, improved image out of a plurality of selected images. By spatially co-registering the plurality of selected images and by detecting the common features or elements in each image, extracting, e.g., geometrically, the specific feature or elements in an image and replacing the poorer evaluated feature or elements with the better feature or elements. Each image of the plurality of images may be evaluated by performing image quality assessment derived from metadata, performing image content and context analysis for understanding what was captured in the image and by evaluating user's preferences, e.g., from user input and from pre-gathered information. A scoring function may be applied for each image in a related cluster based on the evaluation processes. An evaluation function may be applied on each detected feature in the image, e.g., smile, state of the eyes, shadowing and the like. For example, standard or proprietary image processing tools may be used to detect and identify objects and features in the images. For example, tagging algorithms provided as part of a mobile device computer vision library (e.g. COTS and other open source libraries) may be applied on each image. The tagging process may detect or recognize faces including, eyes, mouths, nose, state of the eyes e.g., red eye, blinking etc., state of feeling such as smiling and more, pets, common objects such as bowls, papers, tables, cars, plants and more. Embodiments of the invention may search for similar images and for specific evaluated features which may be different in the images in order to replace the poorer evaluated features or elements with an improved feature or element to reach synthesized, improved image.

Some embodiments of the invention may include clustering images based on encoded hues information. The hue-based encoding process may be used for identifying hues which are significant, important, interest, primary or meaningful in the image. A set of meaningful hues may be extracted from the encoded image and may be saved, e.g., may be written into the metadata file of the image. Each hue which may be detected during the encoding process may be used as a source of information in a three-dimensional axis system, e.g., such as the HSV color space. For example, an influence function value of a selected hue may equal 1 or may represent energy level equals to 1 unit that may induce other points in the image proportionally to their relative distance from the selected hue. An energy summation process, e.g., based on an influence function may be applied to all hues to define meaningful hues clusters. After calculating or identifying hue clusters, each digital image may be assigned into a hue cluster, such that the data is divided based on hue similarity. Embodiments of the invention may allow to classify or divide data based on hue similarity.

Figure 11:
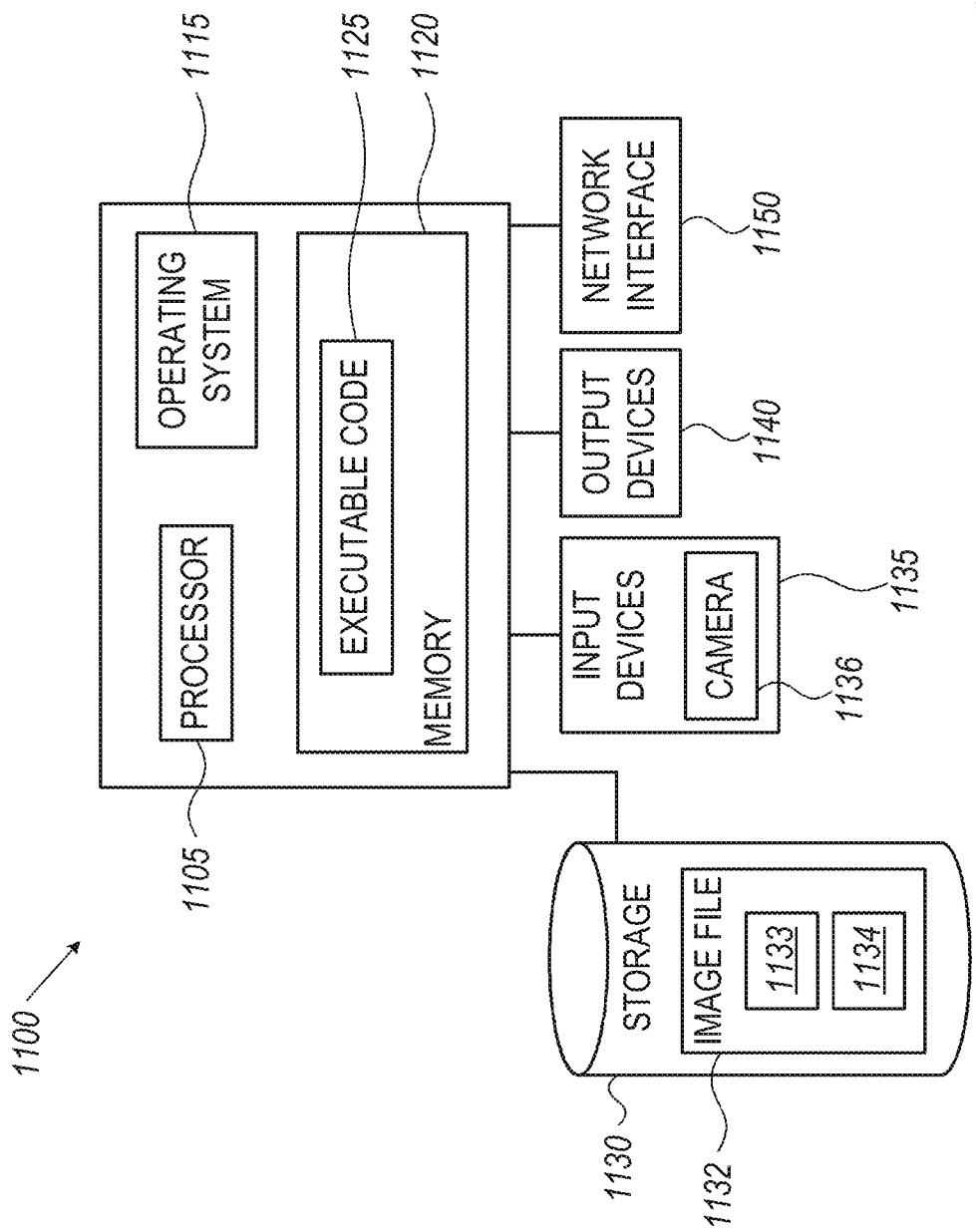
FIG. 11 illustrates an exemplary computing device according to an embodiment of the invention.

FIG. 11 illustrates an exemplary computing device according to an embodiment of the invention. For example, a computing device 1100 with a processor 1105 may be used to encode a digital image or a plurality of digital images and to perform hue-based encoding operation, according to embodiments of the invention.

Computing device 1100 may include a processor 115 that may be, for example, a central processing unit processor (CPU), a chip or any suitable computing or computational device, an operating system 1115, a memory 1120, a storage 1130, input devices 1135 and output devices 1140. Processor 1105 may be or include one or more processors, etc., co-located or distributed. Computing device 1100 may be for example a smart device, a smartphone, workstation or a personal computer, a laptop, or may be at least partially implemented by one or more remote servers (e.g., in the "cloud").

Operating system 1115 may be or may include any code segment designed and/or configured to perform tasks involving coordination, scheduling, arbitration, supervising, controlling or otherwise managing operation of computing device 1100, for example. Operating system 1115 may be a commercial operating system. Memory 1120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 1120 may be or may include a plurality of possibly different memory units.

Executable code 1125 may be any executable code, e.g., an application, a program, a process, task or script. Executable code 1125 may be executed by processor 1105 possibly under control of operating system 1115. For example, executable code 1125 may be or include code for encoding one or more digital images, according to embodiments of the invention.

Storage 1130 may be or may include, for example, a hard disk drive, a floppy disk drive, a Compact Disk (CD) drive, a CD-Recordable (CD-R) drive, a universal serial bus (USB) device or other suitable removable and/or fixed storage unit. In some embodiments, some of the components shown in FIG. 11 may be omitted. For example, memory 1120 may be a non-volatile memory having the storage capacity of storage 1130. Accordingly, although shown as a separate component, storage 1130 may be embedded or included in memory 1120. Storage 1130 and or memory 1120 may be configured to store an electronic or digital image gallery including image files 732, including a digital image 733 and metadata 734, and any other parameters required for performing embodiments of the invention.

Input devices 1135 may be or may include a camera 1136 for capturing images, a mouse, a keyboard, a touch screen or pad or any suitable input device. It will be recognized that any suitable number of input devices may be operatively connected to computing device 1100 as shown by block 1135. Output devices 1140 may include one or more displays, speakers and/or any other suitable output devices. It will be recognized that any suitable number of output devices may be operatively connected to computing device 1100 as shown by block 1140. Any applicable input/output (I/O) devices may be connected to computing device 1100 as shown by blocks 1135 and 1140. For example, a wired or wireless network interface card (NIC), a modem, printer or facsimile machine, a universal serial bus (USB) device or external hard drive may be included in input devices 1135 and/or output devices 1140. Network interface 1150 may enable device 1100 to communicate with one or more other computers or networks. For example, network interface 1150 may include a Wi-Fi or Bluetooth device or connection, a connection to an intranet or the internet, an antenna etc.

Embodiments described in this disclosure may include the use of a special purpose or general-purpose computer including various computer hardware or software modules, as discussed in greater detail below.

Embodiments within the scope of this disclosure also include computer-readable media, or non-transitory computer storage medium, for carrying or having computer-executable instructions or data structures stored thereon. The instructions when executed may cause the processor to carry out embodiments of the invention. Such computer-readable media, or computer storage medium, can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general-purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computer" may be any computing system as previously defined herein, or any module or combination of modulates running on a computing system.

For the processes and/or methods disclosed, the functions performed in the processes and methods may be implemented in differing order as may be indicated by context. Furthermore, the outlined steps and operations are only provided as examples, and some of the steps and operations may be optional, combined into fewer steps and operations, or expanded into additional steps and operations.

The present disclosure is not to be limited in terms of the particular embodiments described in this application, which are intended as illustrations of various aspects. Many modifications and variations can be made without departing from its scope. Functionally equivalent methods and apparatuses within the scope of the disclosure, in addition to those enumerated, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used in this disclosure is for the purpose of describing particular embodiments only, and is not intended to be limiting.

This disclosure may sometimes illustrate different components contained within, or connected with, different other components. Such depicted architectures are merely exemplary, and many other architectures can be implemented which achieve the same or similar functionality.

Aspects of the present disclosure may be embodied in other forms without departing from its spirit or essential characteristics. The described aspects are to be considered in all respects illustrative and not restrictive. The claimed subject matter is indicated by the appended claims rather than by the foregoing description. All changes which come within the meaning and range of equivalency of the claims are to be embraced within their scope.

The invention claimed is:

1. A method for encoding a digital image, the method comprising:
    obtaining image data of the digital image, wherein the image data comprises a plurality of image pixels;
    selecting a plurality of sample pixels from the plurality of image pixels;
    clustering the plurality of sample pixels based on an influence function to generate a plurality of hue clusters, wherein clustering the plurality of sample pixels comprises:
        setting a cluster radius;
        assigning the influence function to each pixel of the plurality of sample pixels, wherein the influence function is maximal at a position of a pixel and decays along the cluster radius around the position of the pixel;
        for each pixel of the plurality of sample pixels, calculating a sum of influence function values of all the plurality of sample pixels; and
        assigning the plurality of sample pixels to the hue clusters based on the sum of influence function values;
    classifying the image pixels to the plurality of the hue clusters; and
    assigning hue values of the hue clusters to the plurality of the image pixels.

2. The method of claim 1, wherein assigning the plurality of sample pixels to the hue clusters comprises:
    repeating until all sample pixels are assigned to a hue cluster:
        selecting a leading pixel from the plurality of sample pixels with a highest sum of influence function values, that is not yet assigned to a hue cluster, to be a center of a hue cluster; and
        assigning sample pixels located within a sphere having a cluster radius around a position of the leading pixel to the hue cluster.

3. The method of claim 2, wherein a hue value of the leading pixel is set as a hue value of the hue cluster.

4. The method of claim 1, wherein obtaining the image data comprises converting the plurality of image pixels from red, green, blue (RGB) representation to hue, saturation, value (HSV) representation.

5. The method of claim 1, wherein selecting the plurality of sample pixels from the plurality of image pixels is a random selecting process.

6. The method of claim 1, wherein classifying the image pixels to the plurality of the hue clusters is based on statistical maximum likelihood estimation.

7. The method of claim 1, wherein the hue clusters represent leading hue values of the digital image.

8. The method of claim 1, further comprising displaying an encoded digital image by displaying the hue values assigned to each pixel of the plurality of the image pixels.

9. The method of claim 1, wherein the influence function decays linearly.

10. A system for encoding a digital image, the system comprising:
    a memory;
    a processor configured to:
        obtain image data of the digital image, wherein the image data comprises a plurality of image pixels;
        select a plurality of sample pixels from the plurality of image pixels;

cluster the plurality of sample pixels based on an influence function to generate a plurality of hue clusters by:
  setting a cluster radius;
  assigning the influence function to each pixel of the plurality of sample pixels, wherein the influence function is maximal at a position of a pixel and decays along the cluster radius around the position of the pixel;
  for each pixel of the plurality of sample pixels, calculating a sum of influence function values of all the plurality of sample pixels; and
  assigning the plurality of sample pixels to the hue clusters based on the sum of influence function values;
classify the image pixels to the plurality of the hue clusters; and
assign hue values of the hue clusters to the plurality of the image pixels.

11. The system of claim 10, wherein the processor is configured to assign the plurality of sample pixels to the hue clusters by:
  repeating until all sample pixels are assigned to a hue cluster;
    selecting a leading pixel from the plurality of sample pixels with a highest sum of influence function values, that is not yet assigned to a hue cluster, to be a center of a hue cluster; and
    assigning sample pixels located within a sphere having a cluster radius around a position of the leading pixel to the hue cluster.

12. The system of claim 11, wherein a hue value of the leading pixel is set as a hue value of the hue cluster.

13. The system of claim 10, wherein the processor is configured to obtain the image data by:
  converting the plurality of image pixels from red, green, blue (RGB) representation to hue, saturation, value (HSV) representation.

14. The system of claim 10, wherein the processor is configured to select the plurality of sample pixels from the plurality of image pixels by a random selecting process.

15. The system of claim 10, wherein the processor is configured to classify the image pixels to the plurality of the hue clusters based on statistical maximum likelihood estimation.

16. The system of claim 10, wherein the hue clusters represent leading hue values of the digital image.

17. The system of claim 10, wherein the processor is configured display an encoded digital image by displaying the hue values assigned to each pixel of the plurality of the image pixels.

18. The system of claim 10, wherein the influence function decays linearly.

* * * * *